United States Patent Office 3,299,735
Patented Jan. 24, 1967

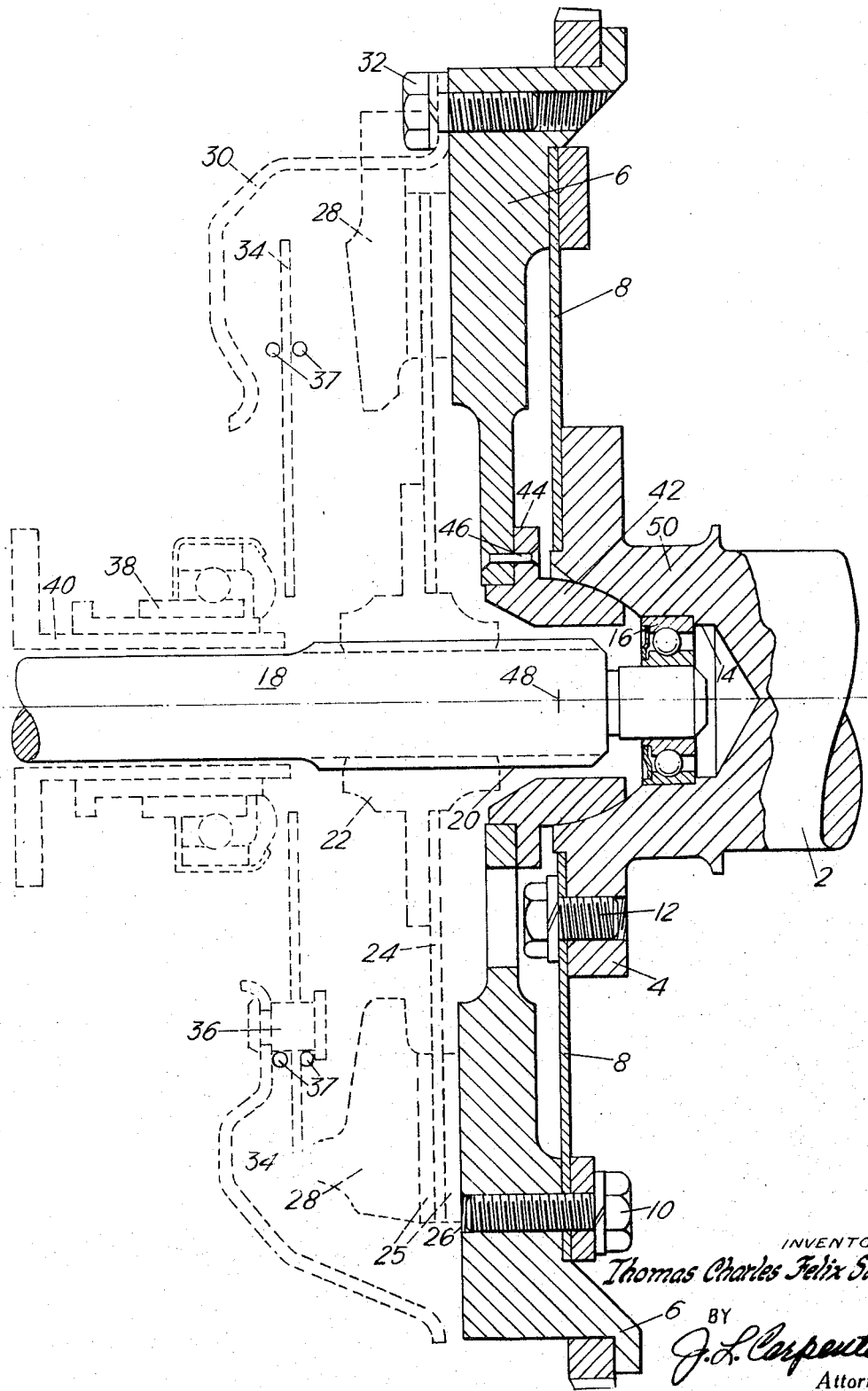

3,299,735
FLYWHEEL ASSEMBLIES
Thomas Charles Felix Stott, Harpenden, England, assignor to General Motors Corporation, Detroit, Mich., a corporation of Delaware
Filed Aug. 3, 1964, Ser. No. 386,940
Claims priority, application Great Britain, Aug. 24, 1963, 33,603/63
7 Claims. (Cl. 74—572)

This invention relates to flywheel assemblies for internal combustion engines, especially although not exclusively for motor vehicles.

Conventional current practice is for the flywheel for an internal combustion engine to be rigidly attached to one end of the engine crankshaft, generally, in a motor vehicle drive train, by bolting the flywheel to a flange at the rear end of the crankshaft. However, crankshaft deflections which can occur at some speeds cause the flywheel to run out of true in a cyclic manner, thereby setting up gyroscopic forces which cause engine roughness at some frequencies. In a motor vehicle drive train, also, the flywheel is required to act as a reaction member for an axially slidably clutch plate, which is biased into engagement with the flywheel by clutch springs for the transmission of drive torque to the driven wheels, but can be disengaged from the flywheel for starting from rest or a gearchange by operation of the clutch pedal. Axial movement of the flywheel is accordingly undesirable, since such movement would deleteriously influence clutch engagement.

According to the present invention a flywheel assembly comprises a flywheel mass, spring means attached to the flywheel mass and adapted, on attachment to the end portion of an internal combustion engine crankshaft, to provide a mounting which permits limited tilting and axial movement of the flywheel mass relatively to the crankshaft, and a spherically surfaced member carried by the flywheel mass and adapted, on cooperation with a complementary spherically surfaced member at the end portion of the crankshaft, to permit the limited tilting of the flywheel mass but restrict the axial movement.

The invention also comprehends a motor vehicle having a drive assembly in which the said flywheel assembly is associated with a crankshaft and transmission shaft and a clutch assembly.

The spring means forming part of the flywheel assembly is preferably a flexible annulus, for example a flexible annular metal plate, and is conveniently bolted to an external flange on the rear end of the crankshaft.

The spherically surfaced member which is carried by the flywheel mass is preferably a portion of a sphere, for co-operation in the manner of a ball and socket joint with a complementary ball socket formed in the rear end of the crankshaft. The portion of a sphere may be integral with the flywheel mass, or may be a separate portion, for example of a polyamide material, which is riveted or otherwise secured to the flywheel mass. An alternative though less convenient arrangement comprises a spherically surfaced socket member on the axis of the flywheel mass for the reception of a complementary portion of a sphere projecting from the end of the crankshaft.

The spherically surfaced member which is carried by the flywheel mass preferably has its centre coincident with the centre about which the flywheel mass would be constrained to tilt by the spring means. In the case of spring means comprising a flexible annulus, the centre of this spherically surfaced member is thus preferably in the plane of the annulus.

The scope of the monoply is defined by the appended claims; the invention and how it can be performed are hereinafter particularly described with reference to the single figure of the accompanying drawing, which shows a motor vehicle drive assembly in which a preferred embodiment of a flywheel assembly in accordance with the invention is attached to the rear end portion of the crankshaft of an internal combustion engine, and forms a reaction member for an axially slidable clutch plate for the transmission of drive torque from the crankshaft to a transmission shaft.

In this drive assembly, a crankshaft 2 is formed at its rear end with an external flange 4. An annular flywheel mass 6 is attached to the crankshaft by spring means comprising a flexible metal annulus 8 the outer peripheral portion of which is bolted by bolts 10 to the flywheel mass and the inner peripheral portion of which is bolted by bolts 12 to the crankshaft flange, spring washers being interposed adjacent the heads of the bolts to prevent the bolts from loosening in operation.

The rear end of the crankshaft is formed with a stepped axial bore 14 which contains a bearing 16 by means of which the front end of a coaxially arranged transmission shaft 18 is rotatably supported by the crankshaft. The end portion of the transmission shaft adjacent the bearing is formed with longitudinal external splines 20 on which is mounted an internally splined sleeve 22 carrying an annular clutch plate 24, this clutch plate being provided with opposed facings 25 adjacent a flat annular face 26 on the axial side of the flywheel mass remote from the crankshaft.

On the axial side of the clutch plate remote from the flywheel mass is a clutch presser plate 28 which is supported for axial movement by a support member 30 bolted to the flywheel mass by bolts 32. One or more radially extending clutch springs 34 are supported intermediate their ends by the support member via a support element 36 provided with a pair of O-rings 37, and normally engage the presser plate with their outer ends to urge the presser plate in a rightward axial direction (as viewed in the figure) against the slidable clutch plate, thereby holding this plate tightly against the flat annular face of the flywheel for the transmission of drive torque from the flywheel through the clutch plate and the splined connection to the transmission shaft. Other known forms of clutch spring could alternatively be used. A clutch throw-out sleeve 38 is slidably mounted on an extension 40 of the gearbox front cover: depression of the clutch pedal of the vehicle causes the clutch throw-out sleeve to move axially to the right (as viewed in the figure) to cause axial movement of the inner ends of the clutch springs to the right, this moving the outer ends of the clutch springs to the left to relieve the engagement pressure of the outer ends of the clutch springs on the presser plate to effect declutching.

The inner peripheral portion of the flywheel mass 6 carries a spherically surfaced member 42, the member shown being made of polyamide material and comprising a portion of a hollow sphere with an external flange 44 by means of which the member is secured by rivets 46 to the flywheel mass. The centre 48 of the spherical surface of the member is in the plane of the flexible annulus 8. The rear end of the crankshaft is also formed with an internal complementary spherically surfaced socket member 50 for the reception of the spherically surfaced member on the flywheel mass.

The flexible annulus 8 by means of which the flywheel mass is attached to the crankshaft permits limited tilting and axial movement of the flywheel mass relatively to the crankshaft axis. The spherically surfaced members 42 and 50 on the flywheel mass and the end of the crankshaft form in effect a ball and socket joint which, although permitting the limited tilting of the flywheel mass, restricts the axial movement.

During operation of the drive assembly which has been described, rotation of the crankshaft by the vehicle engine (not shown) is accompanied at some engine speeds by the previously mentioned deflection of the rear end portion of the crankshaft. If the flywheel mass were rigidly attached to the rear end of the crankshaft, these crankshaft deflections would cause the flywheel to run out of true in a cyclic manner, thereby setting up gyroscopic forces which would cause engine roughness at some frequencies. However, the attachment of the flywheel mass to the crankshaft by means of the flexible annulus allows limited tilting of the axis of the crankshaft, whereby the gyroscopic forces and accompanying roughness are avoided.

The declutching loads exerted by the clutch springs on the flywheel mass are considerable, being in excess of 300 lbs. It is the function of the spherically surfaced members to transmit these declutching loads to the crankshaft; and, because the flexible annulus does not have to control axial movement of the flywheel mass, the annulus may be made of any desired elasticity. The spherically surfaced members allow the desired tilting of the flywheel axis relatively to the crankshaft axis, since under such conditions they act in the manner of a ball joint. In addition, because the spherically surfaced members prevent appreciable axial movement of the flywheel mass in a forward direction, fine control of clutch engagement is retained.

The spherically surfaced member which is secured to the flywheel mass could alternatively be made integral with the inner peripheral portion of the flywheel mass.

I claim:

1. A flywheel assembly comprising a flywheel mass, spring means in the form of a flexible annulus attached to the flywheel mass and adapted, on attachment to the end portion of an internal combustion engine crankshaft, to provide a mounting which permits limited tilting and axial movement of the flywheel mass relatively to the crankshaft, and a spherically surfaced member made of a polyamide material and secured to the flywheel mass, said member being adapted, on cooperation with a complementary spherically surfaced member at the end portion of the crankshaft, to permit the limited tilting of the flywheel mass but restrict the axial movement.

2. A motor vehicle having a drive assembly comprising an internal combustion engine crankshaft connectable by a clutch assembly to a transmission shaft; a flywheel mass mounted on the end portion of the crankshaft adjacent the clutch assembly by a spring means in the form of a flexible annulus attached to the flywheel mass and to the crankshaft end portion and permitting limited tilting and axial movement of the flywheel mass relatively to the crankshaft; and a spherically surfaced member made of a polyamide material and secured to the flywheel mass, said member cooperating with a complementary spherically surfaced member at the crankshaft end portion to permit the limited tilting of the flywheel mass but restrict the axial movement.

3. A motor vehicle according to claim 2 wherein the complementary spherically surfaced member at the crankshaft end portion is a ball socket formed in the rear end of the crankshaft.

4. A flywheel assembly comprising a flywheel mass, a crankshaft rotatably connected with said flywheel mass and having an end portion adjacent thereto, and flat annulus spring means extending radially between said crankshaft end portion and said flywheel mass, said spring means having an outer portion attached to said flywheel mass and an inner portion attached to said crankshaft end portion and providing a mounting which permits limited tilting and axial movement of the flywheel mass relative to the crankshaft, said flywheel mass and said crankshaft end having complementary spherically surfaced portions engaging one another to permit said limited tilting but restrict said axial movement of the flywheel mass relative to the crankshaft.

5. A flywheel assembly as defined in claim 4 wherein said spherically surfaced members have their centers in the plane of said flat annular spring means.

6. A motor vehicle drive assembly comprising an internal combustion engine crankshaft connectable through a clutch assembly to a transmission shaft, a flywheel mass carried on an end portion of the crankshaft adjacent the clutch assembly by flat annular spring means extending radially between said crankshaft end portion and said flywheel mass, said spring means being connected at its outer periphery to said flywheel mass and at its inner periphery to said crankshaft end portion and permitting limited tilting and axial movement of said flywheel mass relative to said crankshaft, said flywheel mass and said crankshaft end portion having complementary spherically surfaced portions engaging one another so as to permit said limited tilting of the flywheel mass but restrict said axial movement.

7. A motor vehicle drive assembly as defined in claim 6 wherein said spherically surfaced portions have a common center lying in the plane of said flat annular spring means.

References Cited by the Examiner

UNITED STATES PATENTS 921,424   5/1909   Makean _____ 74—573
1,818,932   8/1931   Rieger.

FRED C. MATTERN, Jr., *Primary Examiner.*

MILTON KAUFMAN, *Examiner.*

W. S. RATLIFF, *Assistant Examiner.*